United States Patent
Knight et al.

(10) Patent No.: US 9,336,303 B2
(45) Date of Patent: May 10, 2016

(54) COMPUTER-IMPLEMENTED SYSTEM AND METHOD FOR PROVIDING VISUAL SUGGESTIONS FOR CLUSTER CLASSIFICATION

(71) Applicant: FTI Consulting, Inc., Annapolis, MD (US)

(72) Inventors: William C. Knight, Bainbridge Island, WA (US); Nicholas I. Nussbaum, Seattle, WA (US)

(73) Assignee: FTI Consulting, Inc., Annapolis, MD (US)

(*) Notice: Subject to any disclaimer, the term of this patent is extended or adjusted under 35 U.S.C. 154(b) by 2 days.

(21) Appl. No.: 14/065,364

(22) Filed: Oct. 28, 2013

(65) Prior Publication Data
US 2014/0059048 A1    Feb. 27, 2014

Related U.S. Application Data

(63) Continuation of application No. 12/833,880, filed on Jul. 9, 2010, now Pat. No. 8,572,084.

(60) Provisional application No. 61/229,216, filed on Jul. 28, 2009, provisional application No. 61/236,490, filed on Aug. 24, 2009.

(51) Int. Cl.
*G06F 17/30* (2006.01)
*G06N 5/02* (2006.01)
(Continued)

(52) U.S. Cl.
CPC ...... *G06F 17/30713* (2013.01); *G06F 17/3071* (2013.01); *G06F 17/30601* (2013.01);
(Continued)

(58) Field of Classification Search
CPC .......... G06F 17/3071; G06F 17/30864; G06F 17/30598
USPC ........................ 707/737, 5, 716; 382/173, 305
See application file for complete search history.

(56) References Cited

U.S. PATENT DOCUMENTS 3,416,150 A    12/1968    Lindberg
3,426,210 A    2/1969    Agin
(Continued)

FOREIGN PATENT DOCUMENTS

EP    0886227    12/1998
EP    1024437    8/2000
(Continued)

OTHER PUBLICATIONS

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809, IS.
(Continued)

*Primary Examiner* — Jeffrey A Burke
*Assistant Examiner* — Thong Vu
(74) *Attorney, Agent, or Firm* — Patrick J.S. Inouye; Krista A. Wittman; Leonid Kisselev (57) ABSTRACT

An embodiment provides a computer-implemented system and method for providing visual suggestions for cluster classification. One or more clusters comprising uncoded documents from a set are obtained. A different set of reference documents that are each classified with a code is designated. A cluster center in one of the clusters is identified. The cluster center is compared to one or more of the reference documents. Those of the reference documents that are similar to the cluster are identified based on the comparison. The classification codes of each of the similar reference documents are visually represented as a suggestion for assigning one of the classification codes to the cluster.

18 Claims, 6 Drawing Sheets

(51) Int. Cl.
*G06N 7/00* (2006.01)
*G06N 99/00* (2010.01)

(52) U.S. Cl.
CPC .... *G06F17/30705* (2013.01); *G06F 17/30707* (2013.01); *G06F 17/30873* (2013.01); *G06N 5/02* (2013.01); *G06N 7/005* (2013.01); *G06N 99/005* (2013.01)

(56) References Cited

U.S. PATENT DOCUMENTS

| | | | |
|---|---|---|---|
| 3,668,658 A | 6/1972 | Flores et al. | |
| 4,893,253 A | 1/1990 | Lodder | |
| 5,056,021 A | 10/1991 | Ausborn | |
| 5,121,338 A | 6/1992 | Lodder | |
| 5,133,067 A | 7/1992 | Hara et al. | |
| 5,278,980 A | 1/1994 | Pedersen et al. | |
| 5,371,673 A | 12/1994 | Fan | |
| 5,442,778 A | 8/1995 | Pedersen et al. | |
| 5,477,451 A | 12/1995 | Brown et al. | |
| 5,488,725 A | 1/1996 | Turtle et al. | |
| 5,524,177 A | 6/1996 | Suzuoka | |
| 5,528,735 A | 6/1996 | Strasnick et al. | |
| 5,619,632 A | 4/1997 | Lamping et al. | |
| 5,619,709 A | 4/1997 | Caid et al. | |
| 5,635,929 A | 6/1997 | Rabowsky et al. | |
| 5,649,193 A | 7/1997 | Sumita et al. | |
| 5,675,819 A | 10/1997 | Schuetze | |
| 5,696,962 A | 12/1997 | Kupiec | |
| 5,737,734 A | 4/1998 | Schultz | |
| 5,754,938 A | 5/1998 | Herz et al. | |
| 5,794,236 A | 8/1998 | Mehrle | |
| 5,799,276 A | 8/1998 | Komissarchik et al. | |
| 5,819,258 A | 10/1998 | Vaithyanathan et al. | |
| 5,842,203 A | 11/1998 | D'Elena et al. | |
| 5,844,991 A | 12/1998 | Hochberg et al. | |
| 5,857,179 A | 1/1999 | Vaithyanathan et al. | |
| 5,860,136 A | 1/1999 | Fenner | |
| 5,862,325 A | 1/1999 | Reed et al. | |
| 5,864,846 A | 1/1999 | Voorhees et al. | |
| 5,864,871 A | 1/1999 | Kitain et al. | |
| 5,867,799 A | 2/1999 | Lang et al. | |
| 5,870,740 A | 2/1999 | Rose et al. | |
| 5,909,677 A | 6/1999 | Broder et al. | |
| 5,915,024 A | 6/1999 | Kitaori et al. | |
| 5,920,854 A | 7/1999 | Kirsch et al. | |
| 5,924,105 A | 7/1999 | Punch et al. | |
| 5,940,821 A | 8/1999 | Wical | |
| 5,950,146 A | 9/1999 | Vapnik | |
| 5,950,189 A | 9/1999 | Cohen et al. | |
| 5,966,126 A | 10/1999 | Szabo | |
| 5,987,446 A | 11/1999 | Corey et al. | |
| 6,006,221 A * | 12/1999 | Liddy et al. | |
| 6,012,053 A | 1/2000 | Pant et al. | |
| 6,026,397 A | 2/2000 | Sheppard | |
| 6,038,574 A | 3/2000 | Pitkow et al. | |
| 6,070,133 A | 5/2000 | Brewster et al. | |
| 6,089,742 A | 7/2000 | Warmerdam et al. | |
| 6,092,059 A | 7/2000 | Straforini et al. | |
| 6,094,649 A | 7/2000 | Bowen et al. | |
| 6,100,901 A | 8/2000 | Mohda et al. | |
| 6,119,124 A | 9/2000 | Broder et al. | |
| 6,122,628 A | 9/2000 | Castelli et al. | |
| 6,137,499 A | 10/2000 | Tesler | |
| 6,137,545 A | 10/2000 | Patel et al. | |
| 6,137,911 A | 10/2000 | Zhilyaev | |
| 6,148,102 A | 11/2000 | Stolin | |
| 6,154,219 A | 11/2000 | Wiley et al. | |
| 6,167,368 A | 12/2000 | Wacholder | |
| 6,173,275 B1 | 1/2001 | Caid et al. | |
| 6,202,064 B1 | 3/2001 | Julliard | |
| 6,216,123 B1 | 4/2001 | Robertson et al. | |
| 6,243,713 B1 | 6/2001 | Nelson et al. | |
| 6,243,724 B1 | 6/2001 | Mander et al. | |
| 6,260,038 B1 | 7/2001 | Martin et al. | |
| 6,326,962 B1 | 12/2001 | Szabo | |
| 6,338,062 B1 | 1/2002 | Liu | |
| 6,345,243 B1 | 2/2002 | Clark | |
| 6,349,296 B1 | 2/2002 | Broder et al. | |
| 6,349,307 B1 | 2/2002 | Chen | |
| 6,360,227 B1 | 3/2002 | Aggarwal et al. | |
| 6,363,374 B1 | 3/2002 | Corston-Oliver et al. | |
| 6,377,287 B1 | 4/2002 | Hao et al. | |
| 6,381,601 B1 | 4/2002 | Fujiwara et al. | |
| 6,389,433 B1 | 5/2002 | Bolosky et al. | |
| 6,389,436 B1 | 5/2002 | Chakrabarti et al. | |
| 6,408,294 B1 | 6/2002 | Getchius et al. | |
| 6,414,677 B1 | 7/2002 | Robertson et al. | |
| 6,415,283 B1 | 7/2002 | Conklin | |
| 6,418,431 B1 | 7/2002 | Mahajan et al. | |
| 6,421,709 B1 | 7/2002 | McCormick et al. | |
| 6,438,537 B1 | 8/2002 | Netz et al. | |
| 6,438,564 B1 | 8/2002 | Morton et al. | |
| 6,442,592 B1 | 8/2002 | Alumbaugh et al. | |
| 6,446,061 B1 | 9/2002 | Doerre et al. | |
| 6,449,612 B1 | 9/2002 | Bradley et al. | |
| 6,453,327 B1 | 9/2002 | Nielsen | |
| 6,460,034 B1 | 10/2002 | Wical | |
| 6,470,307 B1 | 10/2002 | Turney | |
| 6,480,843 B2 | 11/2002 | Li | |
| 6,480,885 B1 | 11/2002 | Olivier | |
| 6,484,168 B1 | 11/2002 | Pennock et al. | |
| 6,484,196 B1 | 11/2002 | Maurille | |
| 6,493,703 B1 | 12/2002 | Knight et al. | |
| 6,496,822 B2 | 12/2002 | Rosenfelt et al. | |
| 6,502,081 B1 | 12/2002 | Wiltshire, Jr. et al. | |
| 6,507,847 B1 | 1/2003 | Fleischman | |
| 6,510,406 B1 | 1/2003 | Marchisio | |
| 6,519,580 B1 | 2/2003 | Johnson et al. | |
| 6,523,026 B1 | 2/2003 | Gillis | |
| 6,523,063 B1 | 2/2003 | Miller et al. | |
| 6,542,635 B1 * | 4/2003 | Hu et al. | 382/173 |
| 6,542,889 B1 | 4/2003 | Aggarwal et al. | |
| 6,544,123 B1 | 4/2003 | Tanaka et al. | |
| 6,549,957 B1 | 4/2003 | Hanson et al. | |
| 6,560,597 B1 | 5/2003 | Dhillon et al. | |
| 6,571,225 B1 | 5/2003 | Oles et al. | |
| 6,584,564 B2 | 6/2003 | Olkin et al. | |
| 6,594,658 B2 | 7/2003 | Woods | |
| 6,598,054 B2 | 7/2003 | Schuetze et al. | |
| 6,606,625 B1 | 8/2003 | Muslea et al. | |
| 6,611,825 B1 | 8/2003 | Billheimer et al. | |
| 6,628,304 B2 | 9/2003 | Mitchell et al. | |
| 6,629,097 B1 | 9/2003 | Keith | |
| 6,640,009 B2 | 10/2003 | Zlotnick | |
| 6,651,057 B1 | 11/2003 | Jin et al. | |
| 6,654,739 B1 | 11/2003 | Apte et al. | |
| 6,658,423 B1 | 12/2003 | Pugh et al. | |
| 6,675,159 B1 | 1/2004 | Lin et al. | |
| 6,675,164 B2 | 1/2004 | Kamath et al. | |
| 6,678,705 B1 | 1/2004 | Berchtold et al. | |
| 6,684,205 B1 | 1/2004 | Modha et al. | |
| 6,697,998 B1 | 2/2004 | Damerau et al. | |
| 6,701,305 B1 | 3/2004 | Holt et al. | |
| 6,711,585 B1 | 3/2004 | Copperman et al. | |
| 6,714,929 B1 | 3/2004 | Micaelian et al. | |
| 6,735,578 B2 | 5/2004 | Shetty et al. | |
| 6,738,759 B1 | 5/2004 | Wheeler et al. | |
| 6,747,646 B2 | 6/2004 | Gueziec et al. | |
| 6,751,628 B2 | 6/2004 | Coady | |
| 6,757,646 B2 | 6/2004 | Marchisio | |
| 6,778,995 B1 | 8/2004 | Gallivan | |
| 6,785,679 B1 | 8/2004 | Dane et al. | |
| 6,804,665 B2 | 10/2004 | Kreulen et al. | |
| 6,816,175 B1 | 11/2004 | Opalka et al. | |
| 6,819,344 B2 | 11/2004 | Robbins | |
| 6,823,333 B2 | 11/2004 | McGreevy | |
| 6,841,321 B2 | 1/2005 | Matsumoto et al. | |
| 6,847,966 B1 | 1/2005 | Sommer et al. | |
| 6,862,710 B1 | 3/2005 | Marchisio | |
| 6,879,332 B2 | 4/2005 | Decombe | |
| 6,883,001 B2 | 4/2005 | Abe | |
| 6,886,010 B2 | 4/2005 | Kostoff | |
| 6,888,584 B2 | 5/2005 | Suzuki et al. | |

(56) References Cited

U.S. PATENT DOCUMENTS

| | | |
|---|---|---|
| 6,915,308 B1 | 7/2005 | Evans et al. |
| 6,922,699 B2 | 7/2005 | Schuetze et al. |
| 6,941,325 B1 | 9/2005 | Benitez et al. |
| 6,970,881 B1 | 11/2005 | Mohan et al. |
| 6,976,207 B1 | 12/2005 | Rujan et al. |
| 6,978,419 B1 | 12/2005 | Kantrowitz |
| 6,990,238 B1 | 1/2006 | Saffer et al. |
| 6,996,575 B2 | 2/2006 | Cox et al. |
| 7,003,551 B2 | 2/2006 | Malik |
| 7,013,435 B2 | 3/2006 | Gallo et al. |
| 7,020,645 B2 | 3/2006 | Bisbee et al. |
| 7,039,856 B2 | 5/2006 | Peairs et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,107,266 B1 | 9/2006 | Breyman et al. |
| 7,117,151 B2 | 10/2006 | Iwahashi et al. |
| 7,117,246 B2 | 10/2006 | Christenson et al. |
| 7,117,432 B1 | 10/2006 | Shanahan et al. |
| 7,130,807 B1 | 10/2006 | Mikurak |
| 7,137,075 B2 | 11/2006 | Hoshino et al. |
| 7,139,739 B2 | 11/2006 | Agrafiotis et al. |
| 7,146,361 B2 | 12/2006 | Broder et al. |
| 7,155,668 B2 | 12/2006 | Holland et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cossock |
| 7,209,949 B2 | 4/2007 | Mousseau et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Donoho et al. |
| 7,325,127 B2 | 1/2008 | Olkin et al. |
| 7,353,204 B2 | 4/2008 | Liu |
| 7,359,894 B1 | 4/2008 | Liebman et al. |
| 7,363,243 B2 | 4/2008 | Arnett et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Copperman et al. |
| 7,412,462 B2 | 8/2008 | Margolus et al. |
| 7,418,397 B2 | 8/2008 | Kojima et al. |
| 7,430,688 B2 | 9/2008 | Matsuno et al. |
| 7,430,717 B1 | 9/2008 | Spangler |
| 7,433,893 B2 | 10/2008 | Lowry |
| 7,440,662 B2 | 10/2008 | Antona et al. |
| 7,444,356 B2 | 10/2008 | Calistri-Yeh et al. |
| 7,457,948 B1 | 11/2008 | Bilicksa et al. |
| 7,472,110 B2 | 12/2008 | Achlioptas |
| 7,490,092 B2 | 2/2009 | Sibley et al. |
| 7,509,256 B2 | 3/2009 | Iwahashi et al. |
| 7,516,419 B2 | 4/2009 | Petro et al. |
| 7,523,349 B2 | 4/2009 | Barras |
| 7,558,769 B2 | 7/2009 | Scott et al. |
| 7,571,177 B2 | 8/2009 | Damle |
| 7,574,409 B2 | 8/2009 | Patinkin |
| 7,584,221 B2 | 9/2009 | Robertson et al. |
| 7,639,868 B1 | 12/2009 | Regli et al. |
| 7,640,219 B2 | 12/2009 | Perrizo |
| 7,647,345 B2 | 1/2010 | Trepess et al. |
| 7,668,376 B2 | 2/2010 | Lin et al. |
| 7,698,167 B2 | 4/2010 | Batham et al. |
| 7,716,223 B2 | 5/2010 | Haveliwala et al. |
| 7,743,059 B2 | 6/2010 | Chan et al. |
| 7,761,447 B2 | 7/2010 | Brill et al. |
| 7,801,841 B2 | 9/2010 | Mishra et al. |
| 7,885,901 B2 | 2/2011 | Hull et al. |
| 7,899,274 B2 * | 3/2011 | Baba et al. ............ 382/305 |
| 7,971,150 B2 | 6/2011 | Rashutti et al. |
| 7,984,014 B2 | 7/2011 | Song et al. |
| 8,010,466 B2 | 8/2011 | Patinkin |
| 8,010,534 B2 | 8/2011 | Roitblat |
| 8,165,974 B2 | 4/2012 | Privault et al. |
| 8,275,773 B2 | 9/2012 | Donnelly et al. |
| 8,311,344 B2 | 11/2012 | Dunlop et al. |
| 8,326,823 B2 | 12/2012 | Grandhi et al. |
| 8,515,946 B2 * | 8/2013 | Marcucci et al. ............ 707/716 |
| 8,676,605 B2 | 3/2014 | Familant |
| 2002/0032735 A1 | 3/2002 | Burnstein et al. |
| 2002/0065912 A1 | 5/2002 | Catchpole et al. |
| 2002/0078044 A1 | 6/2002 | Song et al. |
| 2002/0078090 A1 | 6/2002 | Hwang et al. |
| 2002/0122543 A1 | 9/2002 | Rowen |
| 2002/0184193 A1 | 12/2002 | Cohen |
| 2003/0046311 A1 | 3/2003 | Baidya et al. |
| 2003/0110181 A1 * | 6/2003 | Schuetze ............ G06F 17/30713 |
| 2003/0120651 A1 * | 6/2003 | Bernstein ............ G06F 17/30569 |
| 2003/0130991 A1 | 7/2003 | Reijerse et al. |
| 2003/0172048 A1 | 9/2003 | Kauffman |
| 2003/0174179 A1 | 9/2003 | Suermondt et al. |
| 2004/0024739 A1 | 2/2004 | Copperman et al. |
| 2004/0024755 A1 | 2/2004 | Rickard |
| 2004/0034633 A1 | 2/2004 | Rickard |
| 2004/0181427 A1 * | 9/2004 | Stobbs ............ G06F 17/2785 |
| | | 705/36 R |
| 2004/0205482 A1 | 10/2004 | Basu et al. |
| 2004/0205578 A1 | 10/2004 | Wolf et al. |
| 2004/0215608 A1 | 10/2004 | Gourlay |
| 2004/0243556 A1 | 12/2004 | Ferrucci et al. |
| 2005/0022106 A1 * | 1/2005 | Kawai ............ G06F 17/30705 |
| | | 715/233 |
| 2005/0025357 A1 | 2/2005 | Landwehr et al. |
| 2005/0097435 A1 | 5/2005 | Prakash et al. |
| 2005/0171772 A1 | 8/2005 | Iwahashi et al. |
| 2005/0192956 A1 * | 9/2005 | Evans ............ 707/5 |
| 2005/0203924 A1 | 9/2005 | Rosenberg |
| 2005/0283473 A1 | 12/2005 | Rousso et al. |
| 2006/0008151 A1 | 1/2006 | Lin et al. |
| 2006/0021009 A1 | 1/2006 | Lunt |
| 2006/0053382 A1 | 3/2006 | Gardner et al. |
| 2006/0122974 A1 | 6/2006 | Perisic |
| 2006/0122997 A1 | 6/2006 | Lin |
| 2006/0242013 A1 * | 10/2006 | Agarwal ............ G06Q 30/02 |
| | | 705/14.49 |
| 2007/0020642 A1 | 1/2007 | Deng et al. |
| 2007/0043774 A1 | 2/2007 | Davis et al. |
| 2007/0044032 A1 | 2/2007 | Mollitor et al. |
| 2007/0109297 A1 | 5/2007 | Borchardt et al. |
| 2007/0112758 A1 | 5/2007 | Livaditis |
| 2007/0150801 A1 | 6/2007 | Chidlovskii et al. |
| 2007/0214133 A1 | 9/2007 | Liberty et al. |
| 2007/0288445 A1 | 12/2007 | Kraftsow |
| 2008/0005081 A1 | 1/2008 | Green et al. |
| 2008/0109762 A1 * | 5/2008 | Hundal et al. ............ 715/855 |
| 2008/0140643 A1 | 6/2008 | Ismalon |
| 2008/0183855 A1 | 7/2008 | Agarwal et al. |
| 2008/0189273 A1 | 8/2008 | Kraftsow |
| 2008/0215427 A1 | 9/2008 | Kawada et al. |
| 2008/0228675 A1 | 9/2008 | Daffy et al. |
| 2008/0243817 A1 * | 10/2008 | Chan ............ G06F 17/30867 |
| 2009/0041329 A1 | 2/2009 | Nordell et al. |
| 2009/0043797 A1 | 2/2009 | Dorie et al. |
| 2009/0049017 A1 | 2/2009 | Gross |
| 2009/0097733 A1 | 4/2009 | Hero et al. |
| 2009/0106239 A1 | 4/2009 | Getner et al. |
| 2009/0125505 A1 | 5/2009 | Bhalotia et al. |
| 2009/0208106 A1 * | 8/2009 | Dunlop et al. ............ 382/173 |
| 2009/0222444 A1 | 9/2009 | Chowdhury et al. |
| 2009/0228499 A1 | 9/2009 | Schmidtle et al. |
| 2009/0228811 A1 | 9/2009 | Adams et al. |
| 2009/0259622 A1 | 10/2009 | Kolz et al. |

(56) References Cited

U.S. PATENT DOCUMENTS

| | | | |
|---|---|---|---|
| 2009/0265631 A1* | 10/2009 | Sigurbjornsson et al. | 715/716 |
| 2009/0307213 A1 | 12/2009 | Deng et al. | |
| 2010/0036680 A1* | 2/2010 | Familant | 705/3 |
| 2010/0076857 A1* | 3/2010 | Deo | G06Q 30/00 705/26.1 |
| 2010/0094879 A1* | 4/2010 | Donnelly et al. | 707/749 |
| 2010/0100539 A1 | 4/2010 | Davis et al. | |
| 2010/0198802 A1 | 8/2010 | Kraftsow | |
| 2010/0217745 A1* | 8/2010 | Song et al. | 707/608 |
| 2010/0250477 A1 | 9/2010 | Yadav | |
| 2010/0262571 A1 | 10/2010 | Schmidtler et al. | |
| 2010/0268661 A1 | 10/2010 | Levy et al. | |
| 2010/0312725 A1* | 12/2010 | Privault et al. | 706/12 |
| 2011/0016118 A1* | 1/2011 | Edala | G06F 17/30864 707/730 |
| 2011/0029530 A1* | 2/2011 | Knight | G06F 17/30713 707/737 |
| 2012/0124034 A1 | 5/2012 | Jing et al. | |

FOREIGN PATENT DOCUMENTS

| | | |
|---|---|---|
| EP | 1049030 | 11/2000 |
| WO | 0067162 | 11/2000 |
| WO | 03052627 | 6/2003 |
| WO | 03060766 | 7/2003 |
| WO | 2005073881 | 8/2005 |
| WO | 2006008733 | 1/2006 |

OTHER PUBLICATIONS

Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).

Boukhelifa et al., "A Model and Software System for Coordinated and Multiple Views in Exploratory Visualization," Information Visualization, No. 2, pp. 258-269, GB (2003).

C. Yip Chung et al., "Thematic Mapping—From Unstructured Documents to Taxonomies," CIKM'02, Nov. 4-9, 2002, pp. 608-610, ACM, McLean, Virginia, USA (Nov. 4, 2002).

Chen An et al., "Fuzzy Concept Graph and Application in Web Document Clustering," IEEE, pp. 101-106 (2001).

Davison et al., "Brute Force Estimation of the Number of Human Genes Using EST Clustering as a Measure," IBM Journal of Research & Development, vol. 45, pp. 439-447 (May 2001).

Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190, (Sep. 1996).

Eades et al., "Orthogonal Grid Drawing of Clustered Graphs," Department of Computer Science, the University of Newcastle, Australia, Technical Report 96-04, [Online] 1996, Retrieved from the internet: URL:http://citeseer.ist.psu.edu/eades96ort hogonal.html (1996).

Estivill-Castro et al. "Amoeba: Hierarchical Clustering Based on Spatial Proximity Using Delaunaty Diagram", Department of Computer Science, The University of Newcastle, Australia, 1999 ACM Sigmod International Conference on Management of Data, vol. 28, No. 2, Jun. 1, 1999, Jun. 3, 1999, pp. 49-60, Philadelphia, PA, USA (Jun. 1999).

F. Can, Incremental Clustering for Dynamic Information Processing: ACM Transactions on Information Systems, ACM, New York, NY, US, vol. 11, No. 2, pp. 143-164, XP-002308022 (Apr. 1993).

Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).

http://em-ntserver.unl.edu/Math/mathweb/vecors/vectors.html ©1997.

Inxight VizServer, "Speeds and Simplifies the Exploration and Sharing of Information", www.inxight.com/products/vizserver, copyright 2005.

Jain et al., "Data Clustering: A Review," ACM Computing Surveys, vol. 31, No. 3, Sep. 1999, pp. 264-323, New York, NY, USA (Sep. 1999).

James Osborn et al., "JUSTICE: A Jidicial Search Tool Using Intelligent Cencept Extraction," Department of Computer Science and Software Engineering, University of Melbourne, Australia, ICAIL-99, 1999, pp. 173-181, ACM (1999).

Jiang Linhui, "K-Mean Algorithm: Iterative Partitioning Clustering Algorithm," http://www.cs.regina.ca/- linhui/K.sub.--mean.sub.--algorithm.html, (2001) Computer Science Department, University of Regina, Saskatchewan, Canada (2001).

Kanungo et al., "The Analysis of a Simple K-Means Clustering Algorithm," pp. 100-109, PROC 16th annual symposium of computational geometry (May 2000).

S.S. Weng, C.K. Liu, "Using text classification and multiple concepts to answer e-mails." Expert Systems with Applications, 26 (2004), pp. 529-543.

Slaney, M., et al., "Multimedia Edges: Finding Hierarchy in all Dimensions" Proc. 9-th ACM Intl. Conf. on Multimedia, pp. 29-40, ISBN. 1-58113-394-4, Sep. 30, 2001, XP002295016 Ottawa (Sep. 3, 2001).

Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

Sullivan, Dan., "Document Warehousing and Text Mining: Techniques for Improving Business Operations, Marketing and Sales," Ch. 1-3, John Wiley & Sons, New York, NY (2001).

V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).

Whiting et al., "Image Quantization: Statistics and Modeling," SPIE Conference of Physics of Medical Imaging, San Diego, CA, USA, vol. 3336, pp. 260-271 (Feb. 1998).

Ryall et al., "An Interactive Constraint-Based System for Drawing Graphs," UIST '97 Proceedings of the 10th Annual ACM Symposium on User Interface Software and Technology, pp. 97-104 (1997).

O'Neill et al., "DISCO: Intelligent Help for Document Review," 12th International Conference on Artificial Intelligence and Law, Barcelona, Spain, Jun. 8, 2009, pp. 1-10, ICAIL 2009, Association for Computing Machinery, Red Hook, New York (Online); XP 002607216.

McNee, "Meeting User Information Needs in Recommender Systems," Ph.D. Dissertation, University of Minnesota—Twin Cities, Jun. 2006.

Kawano, Hiroyuki., "Overview of Mondou Web Search Engine Using Text Mining and Information Visualizing Technologies," IEEE, 2001, pp. 234-241.

Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).

Kohonen, T., "Self-Organizing Maps," Ch. 1-2, Springer-Verlag (3rd ed.) (2001).

Kurimo M., "Fast Latent Semantic Indexing of Spoken Documents by Using Self-Organizing Maps" IEEE International Conference on Accoustics, Speech, and Signal Processing, vol. 6, pp. 2425-2428 (Jun. 2000).

Lam et al., "A Sliding Window Technique for Word Recognition," SPIE, vol. 2422, pp. 38-46, Center of Excellence for Document Analysis and Recognition, State University of New Yrok at Baffalo, NY, USA (1995).

Lio et al., "Funding Pathogenicity Islands and Gene Transfer Events in Genome Data," Bioinformatics, vol. 16, pp. 932-940, Department of Zoology, University of Cambridge, UK (Jan. 25, 2000).

(56) References Cited

OTHER PUBLICATIONS

Artero et al., "Viz3D: Effective Exploratory Visualization of Large Multidimensional Data Sets," IEEE Computer Graphics and Image Processing, pp. 340-347 (Oct. 20, 2004).

Magarshak, Greg., Theory & Practice. Issue 01. May 17, 2000. http://www.flipcode.com/articles/tp.sub.--issue01-pf.shtml (May 17, 2000).

Maria Cristin Ferreira de Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).

Rauber et al., "Text Mining in the SOMLib Digital Library System: The Representation of Topics and Genres," Applied Intelligence 18, pp. 271-293, 2003 Kluwer Academic Publishers (2003).

Miller et al., "Topic Islands: A Wavelet Based Text Visualization System," Proceedings of the IEEE Visualization Conference. 1998, pp. 189-196.

North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).

Shuldberg et al., "Distilling Information from Text: The EDS TemplateFiller System," Journal of the American Society for Information Science, vol. 44, pp. 493-507 (1993).

Pelleg et al., "Accelerating Exact K-Means Algorithms With Geometric Reasoning," pp. 277-281, Conf on Knowledge Discovery in Data, Proc fifth ACM SIGKDD (1999).

R.E. Horn, "Communication Units, Morphology, and Syntax," Visual Language: Global Communication for the 21st Century, 1998, Ch. 3, pp. 51-92, MacroVU Press, Bainbridge Island, Washington, USA.

Anna Sachinopoulou, "Multidimensional Visualization," Technical Research Centre of Finland, ESPOO 2001, VTT Research Notes 2114, pp. 1-37 (2001).

B.B. Hubbard, "The World According the Wavelet: The Story of a Mathematical Technique in the Making," AK Peters (2nd ed.), pp. 227-229, Massachusetts, USA (1998).

Baeza-Yates et al., "Modern Information Retrieval," Ch. 2 "Modeling," Modern Information Retrieval, Harlow: Addison-Wesley, Great Britain 1999, pp. 18-71 (1999).

Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 179-484, XP010648809, (2003).

* cited by examiner

COMPUTER-IMPLEMENTED SYSTEM AND METHOD FOR PROVIDING VISUAL SUGGESTIONS FOR CLUSTER CLASSIFICATION

CROSS-REFERENCE TO RELATED APPLICATION

This patent application is a continuation of commonly-assigned U.S. Pat. No. 8,572,084, issued on Oct. 29, 2013, which claims priority under 35 U.S.C. §119(e) to U.S. Provisional Patent Application, Ser. No. 61/229,216, filed Jul. 28, 2009, and U.S. Provisional Patent Application, Ser. No. 61/236,490, filed Aug. 24, 2009, the priority dates of which are claimed and the disclosures of which are incorporated by reference.

FIELD

This application relates in general to using documents as a reference point and, in particular, to a system and method for displaying relationships between electronically stored information to provide classification suggestions via nearest neighbor.

BACKGROUND

Historically, document review during the discovery phase of litigation and for other types of legal matters, such as due diligence and regulatory compliance, have been conducted manually. During document review, individual reviewers, generally licensed attorneys, are assigned sets of documents for coding. A reviewer must carefully study each document and categorize the document by assigning a code or other marker from a set of descriptive classifications, such as "privileged," "responsive," and "non-responsive." The classifications can affect the disposition of each document, including admissibility into evidence.

During discovery, document review can potentially affect the outcome of the underlying legal matter, so consistent and accurate results are crucial. Manual document review is tedious and time-consuming. Marking documents is solely at the discretion of each reviewer and inconsistent results may occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, classification categories, and review techniques.

Currently, with the increasingly widespread movement to electronically stored information (ESI), manual document review is no longer practicable. The often exponential growth of ESI exceeds the bounds reasonable for conventional manual human document review and underscores the need for computer-assisted ESI review tools.

Conventional ESI review tools have proven inadequate to providing efficient, accurate, and consistent results. For example, DiscoverReady LLC, a Delaware limited liability company, custom programs ESI review tools, which conduct semi-automated document review through multiple passes over a document set in ESI form. During the first pass, documents are grouped by category and basic codes are assigned. Subsequent passes refine and further assign codings. Multiple pass review requires a priori project-specific knowledge engineering, which is only useful for the single project, thereby losing the benefit of any inferred knowledge or know-how for use in other review projects.

Thus, there remains a need for a system and method for increasing the efficiency of document review that bootstraps knowledge gained from other reviews while ultimately ensuring independent reviewer discretion.

SUMMARY

Document review efficiency can be increased by identifying relationships between reference ESI and uncoded ESI, and providing a suggestion for classification based on the relationships. The uncoded ESI for a document review project are identified and clustered. At least one of the uncoded ESI is selected from the clusters and compared with the reference ESI based on a similarity metric. The reference ESI most similar to the selected uncoded ESI are identified. Classification codes assigned to the similar reference ESI can be used to provide suggestions for classification of the selected uncoded ESI. Further, a machine-generated suggestion for classification code can be provided with a confidence level.

An embodiment provides a computer-implemented system and method for providing visual suggestions for cluster classification. One or more clusters comprising uncoded documents from a set are obtained. A different set of reference documents that are each classified with a code is designated. A cluster center in one of the clusters is identified. The cluster center is compared to one or more of the reference documents. Those of the reference documents that are similar to the cluster are identified based on the comparison. The classification codes of each of the similar reference documents are visually represented as a suggestion for assigning one of the classification codes to the cluster.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

The ever-increasing volume of ESI underlies the need for automating document review for improved consistency and throughput. Previously coded documents offer knowledge gleaned from earlier work in similar legal projects, as well as a reference point for classifying uncoded ESI.

Providing Suggestions Using Reference Documents

Reference documents are documents that have been previously classified by content and can be used to influence classification of uncoded, that is unclassified, ESI. Specifically, relationships between the uncoded ESI and the reference ESI can be visually depicted to provide suggestions, for instance to a human reviewer, for classifying the visually-proximal uncoded ESI.

Figure 1:
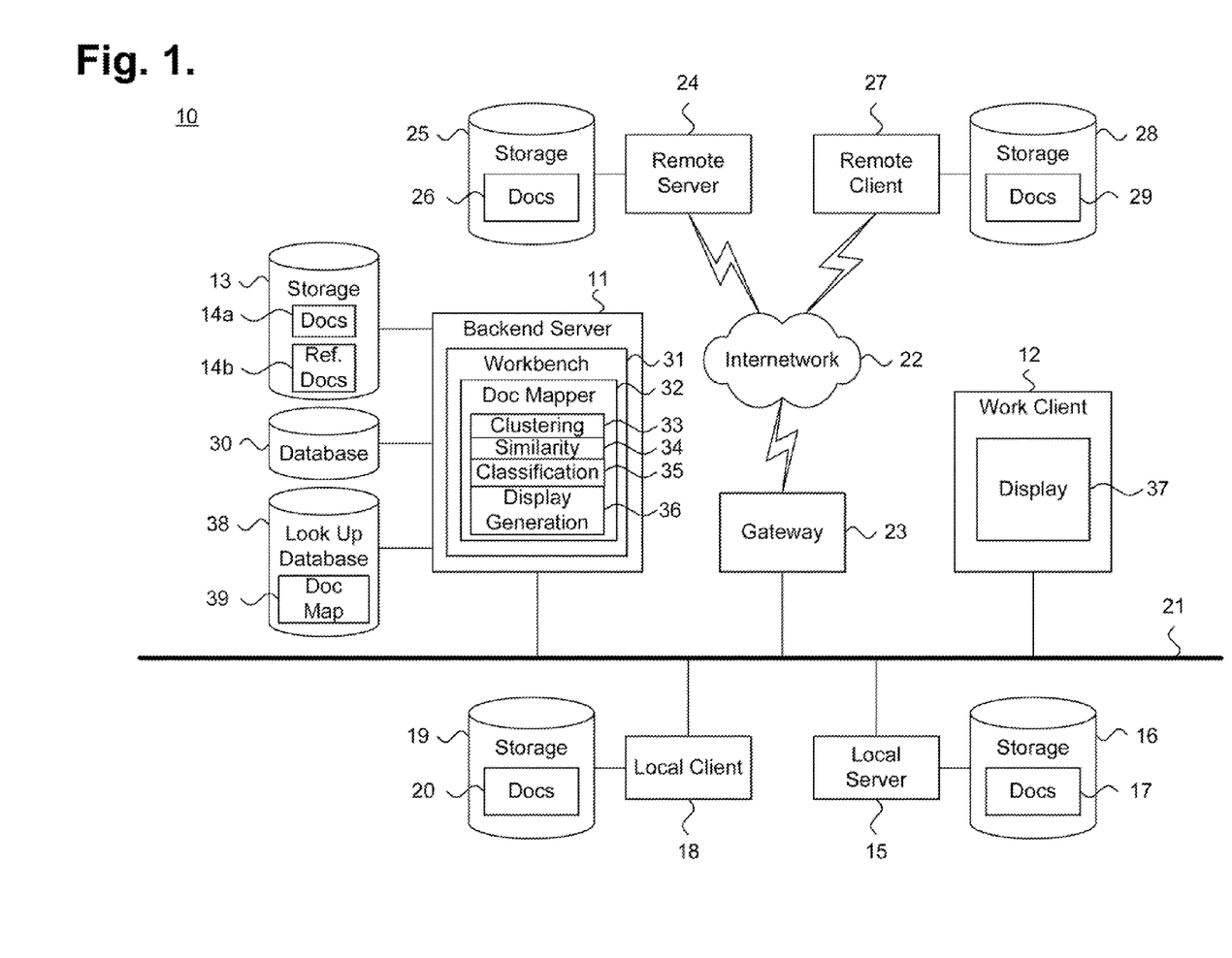
FIG. 1 is a block diagram showing a system for displaying relationships between electronically stored information to provide classification suggestions via nearest neighbor, in accordance with one embodiment.

Complete ESI review requires a support environment within which classification can be performed. FIG. 1 is a block diagram showing a system 10 for displaying relationships between electronically stored information to provide classification suggestions via nearest neighbor, in accordance with one embodiment. By way of illustration, the system 10 operates in a distributed computing environment, which includes a plurality of heterogeneous systems and ESI sources. Henceforth, a single item of ESI will be referenced as a "document," although ESI can include other forms of non-document data, as described infra. A backend server 11 is coupled to a storage device 13, which stores documents 14*a*, such as uncoded documents, in the form of structured or unstructured data, a database 30 for maintaining information about the documents, and a lookup database 38 for storing many-to-many mappings 39 between documents and document features, such as concepts. The storage device 13 also stores reference documents 14*b*, which can provide a training set of trusted and known results for use in guiding ESI classification. The reference documents 14*b* are each associated with an assigned classification code and considered as classified or coded. Hereinafter, the terms "classified" and "coded" are used interchangeably with the same intended meaning, unless otherwise indicated. A set of reference documents can be hand-selected or automatically selected through guided review, which is further discussed below. Additionally, the set of reference documents can be predetermined or can be generated dynamically, as the selected uncoded documents are classified and subsequently added to the set of reference documents.

The backend server 11 is coupled to an intranetwork 21 and executes a workbench suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, similarity searcher 34, classifier 35, and display generator 36. Other workbench suite modules are possible.

The clustering engine 33 performs efficient document scoring and clustering of documents, including uncoded and coded documents, such as described in commonly-assigned U.S. Pat. No. 7,610,313, the disclosure of which is incorporated by reference. Clusters of uncoded documents 14*a* can be formed and organized along vectors, known as spines, based on a similarity of the clusters, which can be expressed in terms of distance. During clustering, groupings of related documents are provided. The content of each document can be converted into a set of tokens, which are word-level or character-level n-grams, raw terms, concepts, or entities. Other tokens are possible. An n-gram is a predetermined number of items selected from a source. The items can include syllables, letters, or words, as well as other items. A raw term is a term that has not been processed or manipulated. Concepts typically include nouns and noun phrases obtained through part-of-speech tagging that have a common semantic meaning. Entities further refine nouns and noun phrases into people, places, and things, such as meetings, animals, relationships, and various other objects. Entities can be extracted using entity extraction techniques known in the field. Clustering of the documents can be based on cluster criteria, such as the similarity of tokens, including n-grams, raw terms, concepts, entities, email addresses, or other metadata.

In a further embodiment, the clusters can include uncoded and coded documents, which are generated based on a similarity with the uncoded documents, as discussed in commonly-owned U.S. Pat. No. 8,713,018, issued on Apr. 29, 2014, and U.S. Pat. No. 8,515,957, issued Aug. 20, 2013, the disclosures of which are incorporated by reference.

Figure 4:
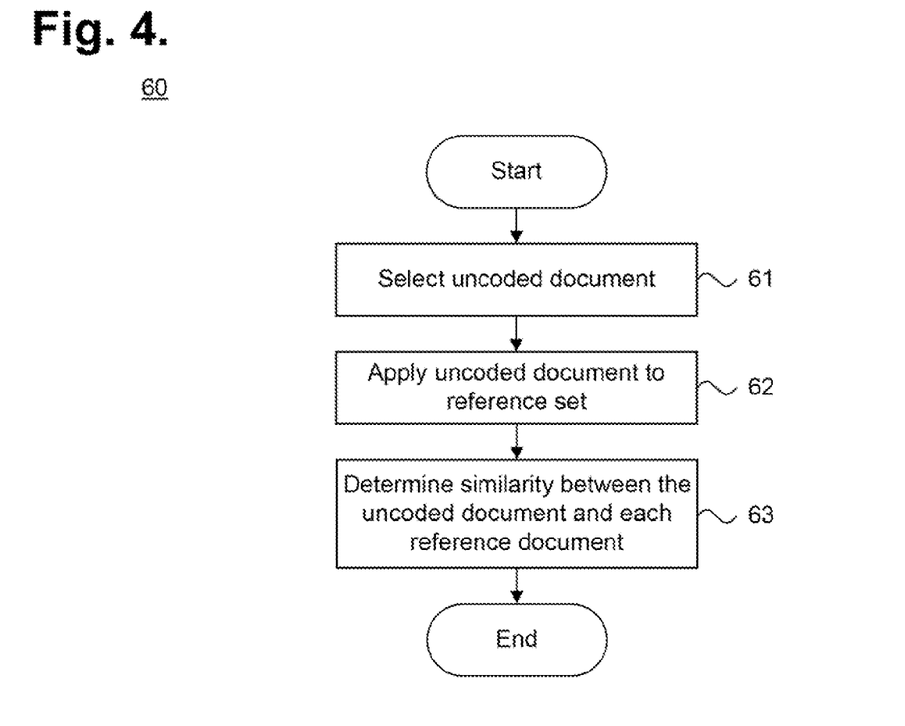
FIG. 4 is a process flow diagram showing, by way of example, a method for comparing an uncoded document to reference documents for use in the method of FIG. 2.

The similarity searcher 34 identifies the reference documents 14*b* that are most similar to selected uncoded documents 14*a*, clusters, or spines, as further described below with reference to FIG. 4. For example, the uncoded documents, reference documents, clusters, and spines can each be represented by a score vector, which includes paired values consisting of a token, such as a term occurring in that document, cluster or spine, and the associated score for that token. Subsequently, the score vector of the uncoded document, cluster, or spine is then compared with the score vectors of the reference documents to identify similar reference documents.

Figure 7:
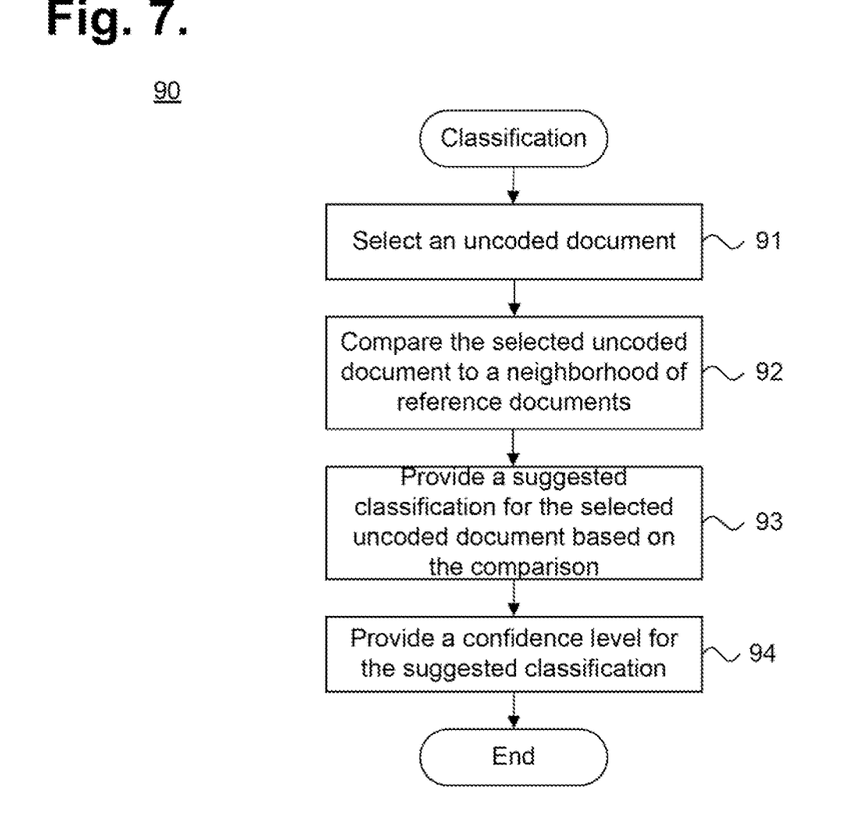
FIG. 7 is a process flow diagram showing, by way of example, a method for classifying uncoded documents for use in the method of FIG. 2.

The classifier 35 provides a machine-generated suggestion and confidence level for classification of selected uncoded documents 14*a*, clusters, or spines, as further described below with reference to FIG. 7. The display generator 36 arranges the clusters and spines in thematic relationships in a two-dimensional visual display space, as further described below beginning with reference to FIG. 5. Once generated, the visual display space is transmitted to a work client 12 by the backend server 11 via the document mapper 32 for presenting to a reviewer on a display 37. The reviewer can include an individual person who is assigned to review and classify one or more uncoded documents by designating a code. Hereinafter, the terms "reviewer" and "custodian" are used interchangeably with the same intended meaning, unless otherwise indicated. Other types of reviewers are possible, including machine-implemented reviewers.

The document mapper 32 operates on uncoded 14*a* and coded documents 14*b*, which can be retrieved from the storage 13, as well as from a plurality of local and remote sources. The local sources include a local server 15, which is coupled to a storage device 16 with documents 17 and a local client 18, which is coupled to a storage device 19 with documents 20. The local server 15 and local client 18 are interconnected to the backend server 11 and the work client 12 over an intranetwork 21. In addition, the document mapper 32 can identify and retrieve documents from remote sources over an internetwork 22, including the Internet, through a gateway 23 interfaced to the intranetwork 21. The remote sources include a remote server 24, which is coupled to a storage device 25 with documents 26 and a remote client 27, which is coupled to a storage device 28 with documents 29. Other document sources, either local or remote, are possible.

The individual documents 17, 20, 26, 29 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 include electronic message folders storing email and attachments, such as maintained by the Outlook and Outlook Express products, licensed by Microsoft Corporation, Redmond, Wash. The database can be an SQL-based relational database, such as the Oracle database management system, Release 8, licensed by Oracle Corporation, Redwood Shores, Calif.

The individual documents 17, 20, 26, 29 can be designated and stored as uncoded documents or reference documents. The uncoded documents, which are unclassified, are selected for a document review project and stored as a document corpus for classification. The reference documents are initially uncoded documents that can be selected from the corpus or other source of uncoded documents, and subsequently classified. The reference documents can assist in providing suggestions for classification of the remaining uncoded documents based on visual relationships between the uncoded documents and reference documents. In a further embodiment, the reference documents can provide classification suggestions for a document corpus associated with a related document review project. In yet a further embodiment, the reference documents can be used as a training set to form machine-generated suggestions for classifying uncoded documents, as further described below with reference to FIG. 7.

The document corpus for a document review project can be divided into subsets of uncoded documents, which are each provided to a particular reviewer as an assignment. To maintain consistency, the same classification codes can be used across all assignments in the document review project. Alternatively, the classification codes can be different for each assignment. The classification codes can be determined using taxonomy generation, during which a list of classification codes can be provided by a reviewer or determined automatically. For purposes of legal discovery, the list of classification codes can include "privileged," "responsive," or "non-responsive;" however, other classification codes are possible. A "privileged" document contains information that is protected by a privilege, meaning that the document should not be disclosed or "produced" to an opposing party. Disclosing a "privileged" document can result in an unintentional waiver of the subject matter disclosed. A "responsive" document contains information that is related to a legal matter on which the document review project is based and a "non-responsive" document includes information that is not related to the legal matter.

The system 10 includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Figure 2:
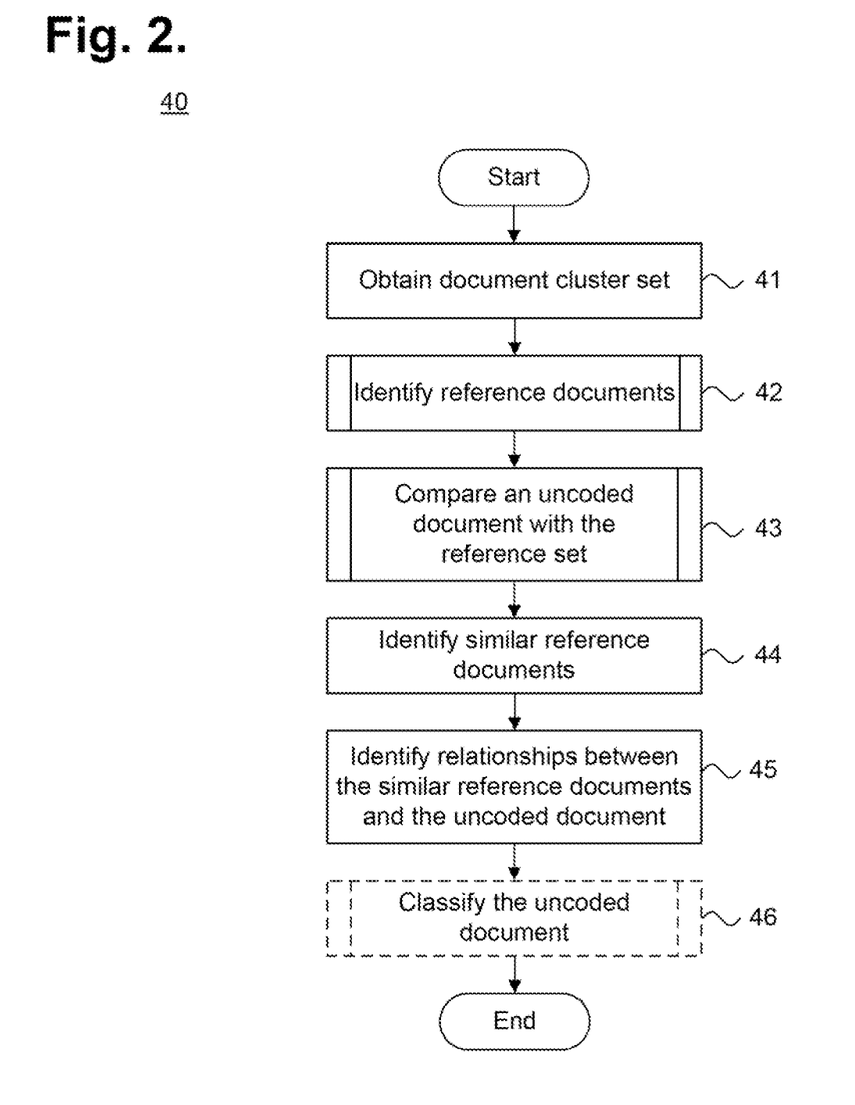
FIG. 2 is a process flow diagram showing a method for displaying relationships between electronically stored information to provide classification suggestions via nearest neighbor, in accordance with one embodiment.

Identifying relationships between the reference documents and uncoded documents includes clustering and similarity measures. FIG. 2 is a process flow diagram showing a method 40 for displaying relationships between electronically stored information to provide classification suggestions via nearest neighbor, in accordance with one embodiment. A set of document clusters is obtained (block 41). In one embodiment, the clusters can include uncoded documents, and in a further embodiment, the clusters can include uncoded and coded documents. The clustered uncoded documents can represent a corpus of uncoded documents for a document review project, or one or more assignments of uncoded documents. The document corpus can include all uncoded documents for a document review project, while, each assignment can include a subset of uncoded documents selected from the corpus and assigned to a reviewer. The corpus can be divided into assignments using assignment criteria, such as custodian or source of the uncoded document, content, document type, and date. Other criteria are possible. Prior to, concurrent with, or subsequent to obtaining the cluster set, reference documents are identified (block 42). The reference documents can include all reference documents generated for a document review project, or alternatively, a subset of the reference documents. Obtaining reference documents is further discussed below with reference to FIG. 3.

An uncoded document is selected from one of the clusters in the set and compared against the reference documents (block 43) to identify one or more reference documents that are similar to the selected uncoded document (block 44). The similar reference documents are identified based on a similarity measure calculated between the selected uncoded document and each reference document. Comparing the selected uncoded document with the reference documents is further discussed below with reference to FIG. 4. Once identified, relationships between the selected uncoded document and the similar reference documents can be identified (block 45) to provide classification hints, including a suggestion for the selected uncoded document, as further discussed below with reference to FIG. 5. Additionally, machine-generated suggestions for classification can be provided (block 46) with an associated confidence level for use in classifying the selected uncoded document. Machine-generated suggestions are further discussed below with reference to FIG. 7. Once the selected uncoded document is assigned a classification code, either by the reviewer or automatically, the newly classified document can be added to the set of reference documents for use in classifying further uncoded documents. Subsequently, a further uncoded document can be selected for classification using similar reference documents.

In a further embodiment, similar reference documents can also be identified for a selected cluster or a selected spine along which the clusters are placed.

Selecting a Document Reference Subset

Figure 3:
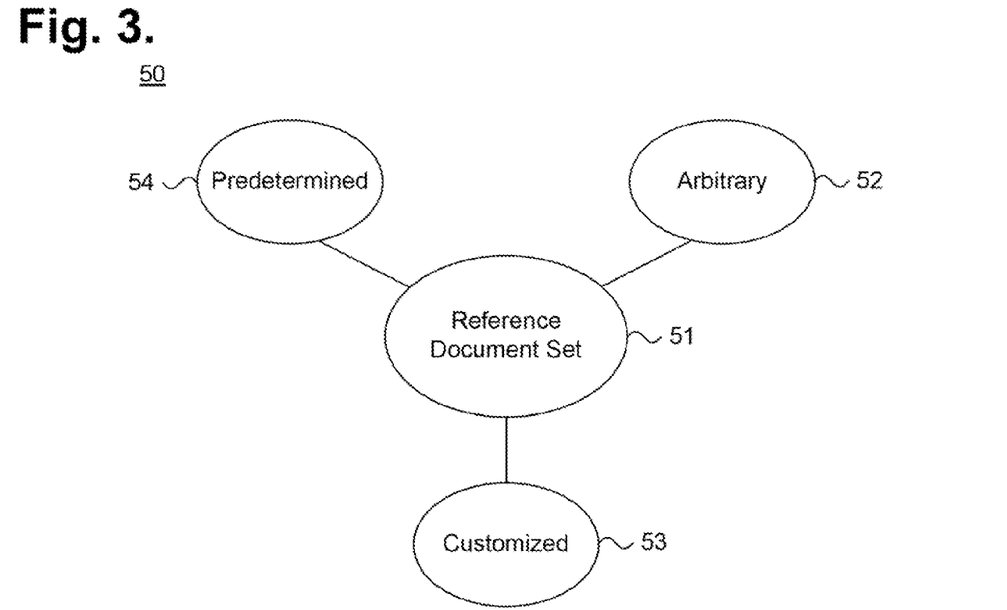
FIG. 3 is a block diagram showing, by way of example, measures for selecting a document reference subset.

After the clusters have been generated, one or more uncoded documents can be selected from at least one of the clusters for comparing with a reference document set or subset. FIG. 3 is a block diagram showing, by way of example, measures 50 for selecting a document reference subset 51. The subset of reference documents 51 can be previously defined 54 and maintained for related document review projects or can be specifically generated for each review project. A predefined reference subset 54 provides knowledge previously obtained during the related document review project to increase efficiency, accuracy, and consistency. Reference subsets newly generated for each review project can include arbitrary 52 or customized 53 reference subsets that are determined automatically or by a human reviewer. An arbitrary reference subset 52 includes reference documents randomly selected for inclusion in the reference subset. A customized reference subset 53 includes reference documents specifically selected for inclusion in the reference subset based on criteria, such as reviewer preference, classification category, document source, content, and review project. Other criteria are possible.

The subset of reference documents, whether predetermined or newly generated, should be selected from a set of reference documents that are representative of the document corpus for a review project in which data organization or classification is desired. Guided review assists a reviewer or other user in identifying reference documents that are representative of the corpus for use in classifying uncoded documents. During guided review, the uncoded documents that are dissimilar to all other uncoded documents are identified based on a similarity threshold. In one embodiment, the dissimilarity can be determined as the cos σ of the score vectors for the uncoded documents. Other methods for determining dissimilarity are possible. Identifying the dissimilar documents provides a group of documents that are representative of the corpus for a document review project. Each identified dissimilar document is then classified by assigning a particular classification code based on the content of the document to collectively generate the reference documents. Guided review can be performed by a reviewer, a machine, or a combination of the reviewer and machine.

Other methods for generating reference documents for a document review project using guided review are possible, including clustering. A set of uncoded documents to be classified is clustered, as described in commonly-assigned U.S. Pat. No. 7,610,313, the disclosure of which is incorporated by reference. A plurality of the clustered uncoded documents are selected based on selection criteria, such as cluster centers or sample clusters. The cluster centers can be used to identify uncoded documents in a cluster that are most similar or dissimilar to the cluster center. The selected uncoded documents are then assigned classification codes. In a further embodiment, sample clusters can be used to generate reference documents by selecting one or more sample clusters based on cluster relation criteria, such as size, content, similarity, or dissimilarity. The uncoded documents in the selected sample clusters are then selected for classification by assigning classification codes. The classified documents represent reference documents for the document review project. The number of reference documents can be determined automatically or by a reviewer. Other methods for selecting documents for use as reference documents are possible.

Comparing a Selected Uncoded Document to Reference Documents

An uncoded document selected from one of the clusters can be compared to the reference documents to identify similar reference documents for use in providing suggestions regarding classification of the selected uncoded document. FIG. 4 is a process flow diagram showing, by way of example, a method 60 for comparing an uncoded document to reference documents for use in the method of FIG. 2. The uncoded document is selected from a cluster (block 61) and applied to the reference documents (block 62). The reference documents can include all reference documents for a document review project or a subset of the reference documents. Each of the reference documents and the selected uncoded document can be represented by a score vector having paired values of tokens occurring within that document and associated token scores. A similarity between the uncoded document and each reference document is determined (block 63) as the cos σ of the score vectors for the uncoded document and reference document being compared and is equivalent to the inner product between the score vectors. In the described embodiment, the cos σ is calculated in accordance with the equation:

$$\cos\sigma_{AB} = \frac{\langle \vec{S}_A \cdot \vec{S}_B \rangle}{|\vec{S}_A||\vec{S}_B|}$$

where $\cos\sigma_{AB}$ comprises a similarity between uncoded document A and reference document B, $\vec{S}_A$ comprises a score vector for uncoded document A, and $\vec{S}_B$ comprises a score vector for reference document B. Other forms of determining similarity using a distance metric are possible, as would be recognized by one skilled in the art, including using Euclidean distance.

One or more of the reference documents that are most similar to the selected uncoded document, based on the similarity metric, are identified. The most similar reference documents can be identified by satisfying a predetermined threshold of similarity. Other methods for determining the similar reference documents are possible, such as setting a predetermined absolute number of the most similar reference documents. The classification codes of the identified similar reference documents can be used as suggestions for classifying the selected uncoded document, as further described below with reference to FIG. 5. Once identified, the similar reference documents can be used to provide suggestions regarding classification of the selected uncoded document, as further described below with reference to FIGS. 5 and 7.

Displaying the Reference Documents

The similar reference documents can be displayed with the clusters of uncoded documents. In the display, the similar reference documents can be provided as a list, while the clusters can be can be organized along spines of thematically related clusters, as described in commonly-assigned U.S. Pat. No. 7,271,804, the disclosure of which is incorporated by reference. The spines can be positioned in relation to other cluster spines based on a theme shared by those cluster spines, as described in commonly-assigned U.S. Pat. No. 7,610,313, the disclosure of which is incorporated by reference. Other displays of the clusters and similar reference documents are possible.

Figure 5:
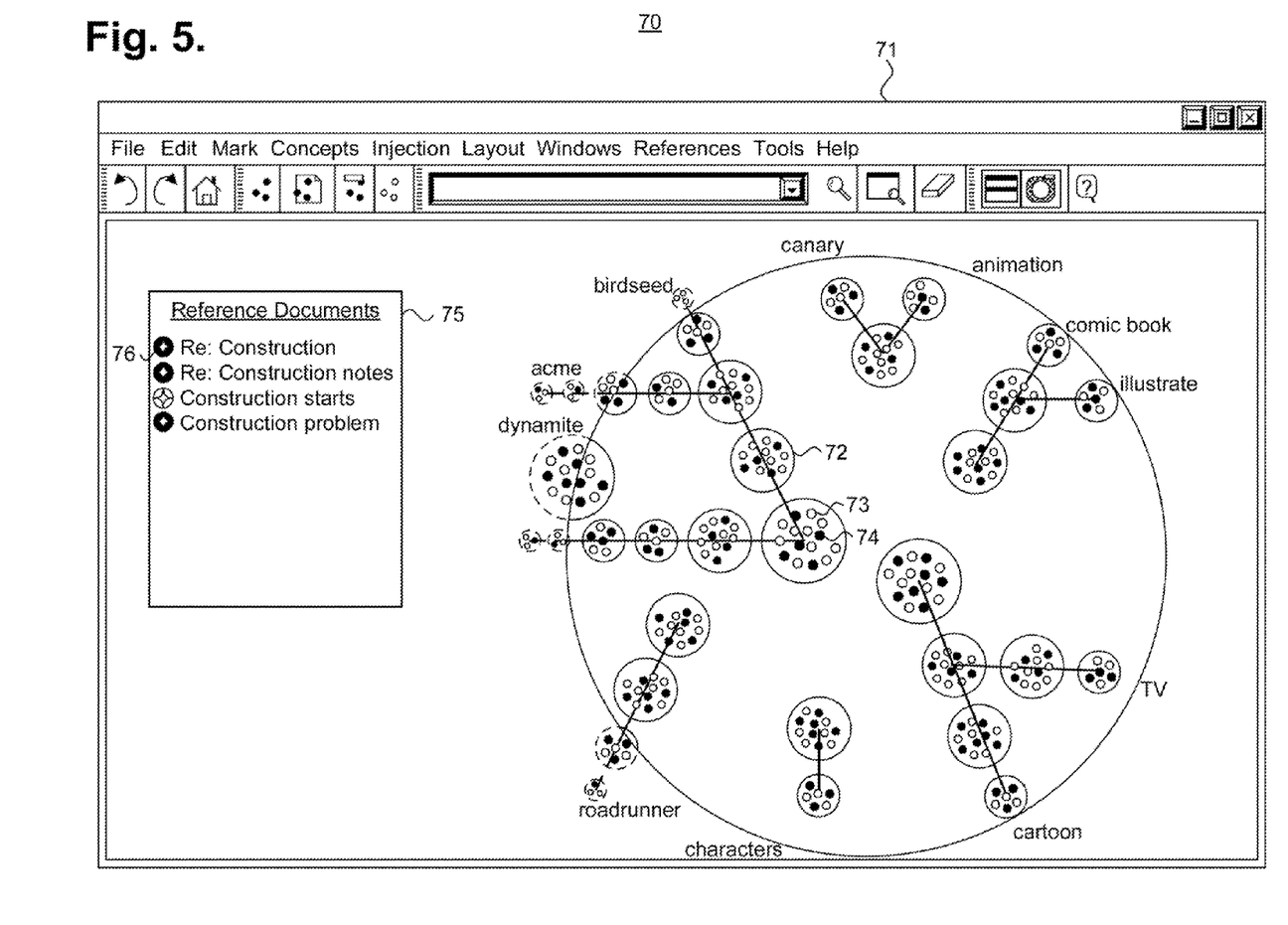
FIG. 5 is a screenshot showing, by way of example, a visual display of reference documents in relation to uncoded documents.

Organizing the clusters into spines and groups of cluster spines provides an individual reviewer with a display that presents the documents according to a theme while maximizing the number of relationships depicted between the documents. FIG. 5 is a screenshot 70 showing, by way of example, a visual display 71 of similar reference documents 74 and uncoded documents 74. Clusters 72 of the uncoded documents 73 can be located along a spine, which is a vector, based on a similarity of the uncoded documents 73 in the clusters 72. The uncoded documents 73 are each represented by a smaller circle within the clusters 72.

Similar reference documents 74 identified for a selected uncoded document 73 can be displayed in a list 75 by document title or other identifier. Also, classification codes 76 associated with the similar reference documents 74 can be displayed as circles having a diamond shape within the boundary of the circle. The classification codes 76 can include "privileged," "responsive," and "non-responsive" codes, as well as other codes. The different classification codes 76 can each be represented by a color, such as blue for "privileged" reference documents and yellow for "non-responsive" reference documents. Other display representations of the uncoded documents, similar reference documents, and classification codes are possible, including by symbols and shapes.

The classification codes 76 of the similar reference documents 74 can provide suggestions for classifying the selected uncoded document based on factors, such as a number of different classification codes for the similar reference documents and a number of similar reference documents associated with each classification code. For example, the list of reference documents includes four similar reference documents identified for a particular uncoded document. Three of the reference documents are classified as "privileged," while one is classified as "non-responsive." In making a decision to assign a classification code to a selected uncoded document, the reviewer can consider classification factors based on the similar reference documents, such as such as a presence or absence of similar reference documents with different classification codes and a quantity of the similar reference documents for each classification code. Other classification factors are possible. In the current example, the display 81 provides suggestions, including the number of "privileged" similar reference documents, the number of "non-responsive" similar reference documents, and the absence of other classification codes of similar reference documents. Based on the number of "privileged" similar reference documents compared to the number of "non-responsive" similar reference documents, the reviewer may be more inclined to classify the selected uncoded documents as "privileged." Alternatively, the reviewer may wish to further review the selected uncoded document based on the multiple classification codes of the similar reference documents. Other classification codes and combinations of classification codes are possible. The reviewer can utilize the suggestions provided by the similar reference documents to assign a classification to the selected uncoded document. In a further embodiment, the now classified and previously uncoded document can be added to the set of reference documents for use in classifying other uncoded documents.

In a further embodiment, similar reference documents can be identified for a cluster or spine to provide suggestions for classifying the cluster and spine. For a cluster, the similar reference documents are identified based on a comparison of a score vector for the cluster, which is representative of the cluster center and the reference document score vectors. Meanwhile, identifying similar reference documents for a spine is based on a comparison between the score vector for the spine, which is based on the cluster center of all the clusters along that spine, and the reference document score vectors. Once identified, the similar reference documents are used for classifying the cluster or spine.

Figure 6:
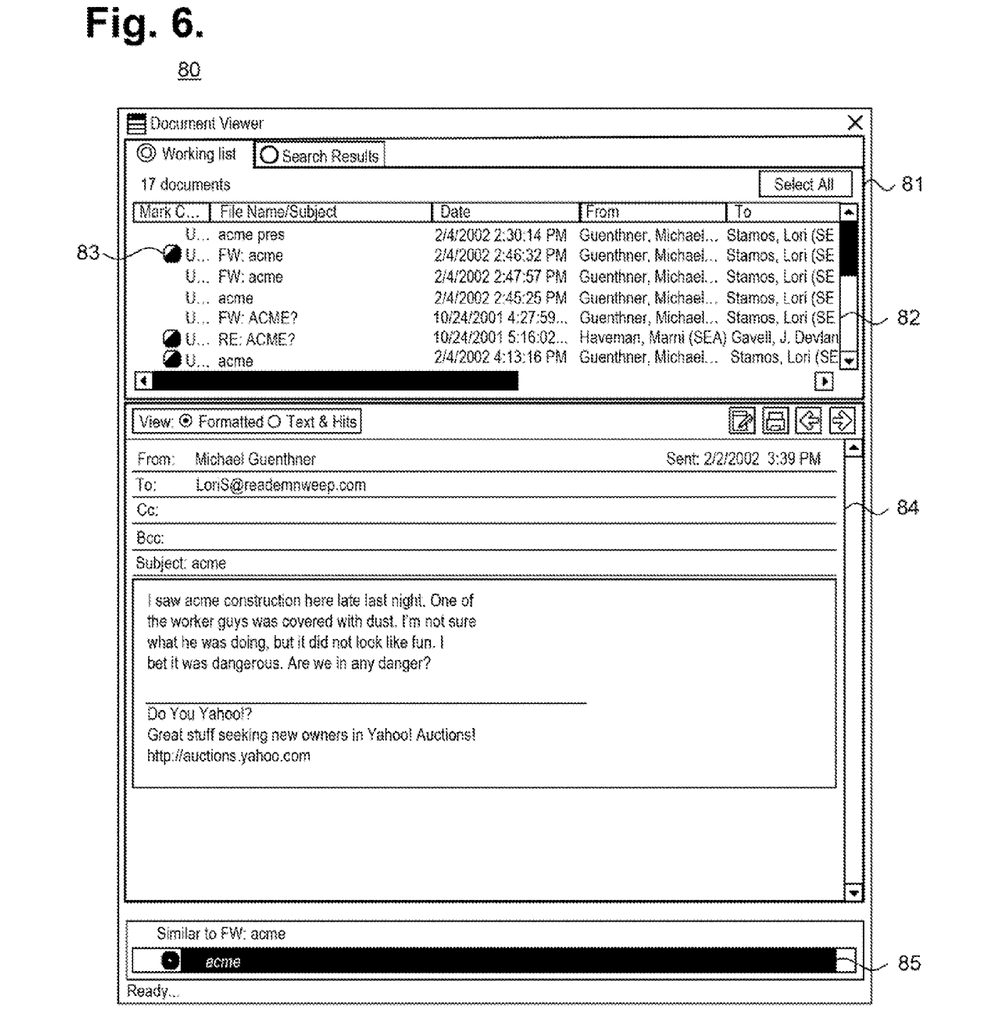
FIG. 6 is an alternative visual display of the similar reference documents and uncoded documents.

In an even further embodiment, the uncoded documents, including the selected uncoded document, and the similar reference documents can be displayed as a document list. FIG. 6 is a screenshot 80 showing, by way of example, an alternative visual display of the similar reference documents 85 and uncoded documents 82. The uncoded documents 82 can be provided as a list in an uncoded document box 81, such as an email inbox. The uncoded documents 82 can be identified and organized using uncoded document factors, such as file name, subject, date, recipient, sender, creator, and classification category 83, if previously assigned.

At least one of the uncoded documents can be selected and displayed in a document viewing box 84. The selected uncoded document can be identified in the list 81 using a selection indicator (not shown), including a symbol, font, or highlighting. Other selection indicators and uncoded document factors are possible. Once identified, the selected uncoded document can be compared to a set of reference documents to identify the reference documents 85 most similar. The identified similar reference documents 85 can be displayed below the document viewing box 84 with an associated classification code 83. The classification code of the similar reference document 85 can be used as a suggestion for classifying the selected uncoded document. After assigning a classification code, a representation 83 of the classification can be provided in the display with the selected uncoded document. In a further embodiment, the now classified and previously uncoded document can be added to the set of reference documents.

Machine Classification of Uncoded Documents

Similar reference documents can be used as suggestions to indicate a need for manual review of the uncoded documents, when review may be unnecessary, and hints for classifying the uncoded documents, clusters, or spines. Additional information can be generated to assist a reviewer in making classification decisions for the uncoded documents, such as a machine-generated confidence level associated with a suggested classification code, as described in common-assigned U.S. Pat. No. 8,635,223, issued Jan. 21, 2014, the disclosure of which is incorporated by reference.

The machine-generated suggestion for classification and associated confidence level can be determined by a classifier. FIG. 7 is a process flow diagram 90 showing, by way of example, a method for classifying uncoded documents by a classifier for use in the method of FIG. 2. An uncoded document is selected from a cluster (block 91) and compared to a neighborhood of x-similar reference documents (block 92) to identify those similar reference documents that are most relevant to the selected uncoded document. The selected uncoded document can be the same as the uncoded document selected for identifying similar reference documents or a different uncoded document. In a further embodiment, a machine-generated suggestion can be provided for a cluster or spine by selecting and comparing the cluster or spine to a neighborhood of x-reference documents for the cluster or spine.

The neighborhood of x-similar reference documents is determined separately for each selected uncoded document and can include one or more similar reference documents. During neighborhood generation, a value for x similar reference documents is first determined automatically or by an individual reviewer. The neighborhood of similar reference documents can include the reference documents, which were identified as similar reference documents according to the method of FIG. 4, or reference documents located in one or more clusters, such as the same cluster as the selected uncoded document or in one or more files, such as an email file. Next, the x-number of similar reference documents nearest to the selected uncoded document are identified. Finally, the identified x-number of similar reference documents are provided as the neighborhood for the selected uncoded document. In a further embodiment, the x-number of similar reference documents are defined for each classification code, rather than across all classification codes. Once generated, the x-number of similar reference documents in the neighborhood and the selected uncoded document are analyzed by the classifier to provide a machine-generated classification suggestion for assigning a classification code (block 93). A confidence level for the machine-generated classification suggestion is also provided (block 94).

The machine-generated analysis of the selected uncoded document and x-number of similar reference documents can be based on one or more routines performed by the classifier, such as a nearest neighbor (NN) classifier. The routines for determining a suggested classification code include a minimum distance classification measure, also known as closest neighbor, minimum average distance classification measure, maximum count classification measure, and distance weighted maximum count classification measure. The minimum distance classification measure for a selected uncoded document includes identifying a neighbor that is the closest distance to the selected uncoded document and assigning the classification code of the closest neighbor as the suggested classification code for the selected uncoded document. The closest neighbor is determined by comparing the score vectors for the selected uncoded document with each of the x-number of similar reference documents in the neighborhood as the cos σ to determine a distance metric. The distance metrics for the x-number of similar reference documents are compared to identify the similar reference document closest to the selected uncoded document as the closest neighbor.

The minimum average distance classification measure includes calculating an average distance of the similar reference documents for each classification code. The classification code of the similar reference documents having the closest average distance to the selected uncoded document is assigned as the suggested classification code. The maximum count classification measure, also known as the voting classification measure, includes counting a number of similar reference documents for each classification code and assigning a count or "vote" to the similar reference documents based on the assigned classification code. The classification code with the highest number of similar reference documents or "votes" is assigned to the selected uncoded document as the suggested classification code. The distance weighted maximum count classification measure includes identifying a count of all similar reference documents for each classification code and determining a distance between the selected uncoded document and each of the similar reference documents. Each count assigned to the similar reference documents is weighted based on the distance of the similar reference document from the selected uncoded document. The classification code with the highest count, after consideration of the weight, is assigned to the selected uncoded document as the suggested classification code.

The machine-generated suggested classification code is provided for the selected uncoded document with a confidence level, which can be presented as an absolute value or a percentage. Other confidence level measures are possible. The reviewer can use the suggested classification code and confidence level to assign a classification to the selected uncoded document. Alternatively, the x-NN classifier can automatically assign the suggested classification code. In one embodiment, the x-NN classifier only assigns an uncoded document with the suggested classification code if the confidence level is above a threshold value, which can be set by the reviewer or the x-NN classifier.

Machine classification can also occur on a cluster or spine level once one or more documents in the cluster have been classified. For instance, for cluster classification, a cluster is selected and a score vector for the center of the cluster is determined as described above with reference to FIG. 4. A neighborhood for the selected cluster can be determined based on a distance metric. The x-number of similar reference documents that are closest to the cluster center can be selected for inclusion in the neighborhood, as described above. Each document in the selected cluster is associated with a score vector from which the cluster center score vector is generated. The distance is then determined by comparing the score vector of the cluster center with the score vector for each of the similar reference documents to determine an x-number of similar reference documents that are closest to the cluster center. However, other methods for generating a neighborhood are possible. Once determined, one of the classification routines is applied to the neighborhood to determine a suggested classification code and confidence level for the selected cluster. The neighborhood of x-number of reference documents is determined for a spine by comparing a spine score vector with the vector for each similar reference document to identify the neighborhood of similar documents that are the most similar.

Providing classification suggestions and suggested classification codes has been described in relation to uncoded documents and reference documents. However, in a further embodiment, classification suggestions and suggested classification codes can be provided for the uncoded documents based on a particular token identified within the uncoded documents. The token can include concepts, n-grams, raw terms, and entities. In one example, the uncoded tokens, which are extracted from uncoded documents, can be clustered. A token can be selected from one of the clusters and compared with reference tokens. Relationships between the uncoded token and similar reference tokens can be displayed to provide classification suggestions for the uncoded token. The uncoded documents can then be classified based on the classified tokens.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for providing visual suggestions for cluster classification, comprising:
    a cluster module to obtain one or more clusters comprising uncoded documents from a set, each cluster associated with a visual representation;
    a designation module to designate a different set of reference documents that are each classified with a code, each code associated with a visual representation different from the representations of the clusters and from the representations of the remaining classification codes;
    a cluster center module to identify a cluster center in one of the clusters comprising the uncoded documents and to compare the cluster center to one or more of the reference documents;
    a similarity module to identify those of the reference documents that are similar to the cluster based on the comparison; and
    a representation module to provide a visual suggestion for assigning one of the classification codes to the cluster comprising the cluster center by displaying the visual representation of the cluster comprising the cluster center together with a list of all of the reference documents similar to the cluster and the visual representations of the classification codes of each of the similar reference documents in the list.

2. A system according to claim 1, wherein the visual representation of the each classification codes comprises at least one of a symbol, shape, and color different from the visual representations of the remaining classification codes.

3. A system according to claim 1, further comprising:
    a spine module to determine a similarity between the clusters and to organize the clusters along one or more spines based on the similarity, each of the spines comprising a vector;

a spine vector module to identify cluster centers for all of the clusters along one of the spines and to generate a score vector for the spine based on the cluster centers;

a reference document vector module to generate score vectors for the reference documents based on content of the reference documents;

a comparison module to compare the score vector for the spine to the score vectors for the reference documents and to identify those of the reference documents that are similar to the spine based on the comparison of the spine score vector to the score vectors of the reference documents;

a spine classification module to visually represent the classification codes of each of the reference documents similar to the spine as a suggestion for assigning one of the classification codes to the spine.

4. A system according to claim 3, further comprising at least one of:

a spine neighborhood module to generate a neighborhood comprising a predetermined number of the reference concepts most similar to the spine based on the comparison of the spine score vector to the score vectors of the reference documents and to assigning one of the classification codes to the spine based on the classification codes of the reference documents in the neighborhood; and a cluster neighborhood module to generate a neighborhood for the cluster comprising a predetermined number of the reference concepts most similar to the cluster based on the comparison of the cluster center to the reference documents and to assign one of the classification codes to the cluster based on the classification codes of the reference documents in the neighborhood for the cluster.

5. A system according to claim 1, further comprising:

a list module to represent one or more of the uncoded documents from the set in a further list displayed on a display;

a selection module to receive a user selection of one of the uncoded documents in the displayed further list;

a comparison module to compare the selected uncoded document to the reference documents and to identify reference documents that are similar to the selected uncoded document based on the comparison of the selected uncoded document to the reference documents; and a display module to represent the reference documents similar to the selected uncoded document and the classification codes for each of the reference documents similar to the selected uncoded documents on the display together with the displayed further list.

6. A system according to claim 1, further comprising:

a document neighborhood module to compare one of the uncoded documents in one of the clusters to the reference documents and to generate a neighborhood comprising a predetermined number of the reference documents that are most similar to the uncoded document based on the comparison of the uncoded document to the reference documents; and a suggestion module to suggest one of the classification codes for assignment to the uncoded document based on the classification codes of the reference concepts in the neighborhood.

7. A system according to claim 6, wherein the predetermined number comprises a sum of predetermined numbers of reference documents for each of the classification codes.

8. A system according to claim 6, further comprising:

a distance module to determine a distance between the uncoded document and the reference documents in the neighborhood; and a generation module to generate the suggested classification code for the uncoded document, comprising at least one of:

identifying the reference document with the closest distance to the uncoded document and to assign the classification code of the reference document with the closest distance as the suggested classification code for the uncoded document;

a maximum count module to calculate an average of the distances between the uncoded document and the reference documents associated with each of the classification codes and to assign the classification code with the closest average distance as the suggested classification code of the uncoded document; and a weighted maximum count module to count the reference documents in the neighborhood for each of the classification codes, to weigh each count based on the distance between the reference documents included in the count and the uncoded document, and to assign the classification code with the highest weighted count as the suggested classification code of the uncoded document.

9. A system according to claim 6, further comprising:

a confidence level module to provide a confidence level for the suggested classification code.

10. A computer-implemented method for providing visual suggestions for cluster classification, comprising:

obtaining one or more clusters comprising uncoded documents from a set, each cluster associated with a visual representation;

designating a different set of reference documents that are each classified with a code, each code associated with a visual representation different from the representations of the clusters and from the representations of the remaining classification codes;

identifying a cluster center in one of the clusters and comparing the cluster center to one or more of the reference documents;

identifying those of the reference documents that are similar to the cluster based on the comparison; and providing a visual suggestion for assigning one of the classification codes to the cluster comprising the cluster center, comprising displaying the visual representation of the cluster comprising the cluster center together with a list of all of the reference documents similar to the cluster and the visual representations of the classification codes of each of the similar reference documents in the list.

11. A method according to claim 10, wherein the visual representation of the each classification codes comprises at least one of a symbol, shape, and color different from the visual representations of the remaining classification codes.

12. A method according to claim 10, further comprising:

determining a similarity between the clusters and organizing the clusters along one or more spines based on the similarity, each of the spines comprising a vector;

identifying cluster centers for all of the clusters along one of the spines and generating a score vector for the spine based on the cluster centers;

generating score vectors for the reference documents based on content of the reference documents;

comparing the score vector for the spine to the score vectors for the reference documents and identifying those of the reference documents that are similar to the spine based on the comparison of the spine score vector to the score vectors of the reference documents;

visually representing the classification codes of each of the reference documents similar to the spine as a suggestion for assigning one of the classification codes to the spine.

13. A method according to claim 12, further comprising at least one of:

generating a neighborhood comprising a predetermined number of the reference concepts most similar to the spine based on the comparison of the spine score vector to the score vectors of the reference documents and assigning one of the classification codes to the spine based on the classification codes of the reference documents in the neighborhood; and generating a neighborhood for the cluster comprising a predetermined number of the reference concepts most similar to the cluster based on the comparison of the cluster center to the reference documents and assigning one of the classification codes to the cluster based on the classification codes of the reference documents in the neighborhood for the cluster.

14. A method according to claim 10, further comprising:

representing one or more of the uncoded documents from the set in a further list displayed on a display;

receiving a user selection of one of the uncoded documents in the displayed further list;

comparing the selected uncoded document to the reference documents and identifying reference documents that are similar to the selected uncoded document based on the comparison of the selected uncoded document to the reference documents; and representing the reference documents similar to the selected uncoded document and the classification codes for each of the reference documents similar to the selected uncoded documents on the display together with the displayed further list.

15. A method according to claim 10, further comprising:

comparing one of the uncoded documents in one of the clusters to the reference documents and generating a neighborhood comprising a predetermined number of the reference documents that are most similar to the uncoded document based on the comparison of the uncoded document to the reference documents; and suggesting one of the classification codes for assignment to the uncoded document based on the classification codes of the reference concepts in the neighborhood.

16. A method according to claim 15, wherein the predetermined number comprises a sum of predetermined numbers of reference documents for each of the classification codes.

17. A method according to claim 15, further comprising:

determining a distance between the uncoded document and the reference documents in the neighborhood; and generating the suggested classification code for the uncoded document, comprising at least one of:

identifying the reference document with the closest distance to the uncoded document and assigning the classification code of the reference document with the closest distance as the suggested classification code for the uncoded document;

calculating an average of the distances between the uncoded document and the reference documents associated with each of the classification codes and assigning the classification code with the closest average distance as the suggested classification code of the uncoded document; and counting the reference documents in the neighborhood for each of the classification codes, weighing each count based on the distance between the reference documents with the classification code and the uncoded document, and assigning the classification code with the highest weighted count as the classification code of the uncoded document.

18. A method according to claim 15, further comprising:

providing a confidence level with the suggested classification code.

* * * * *